United States Patent
Cherukuri

(10) Patent No.: US 11,353,708 B1
(45) Date of Patent: *Jun. 7, 2022

(54) CUSTOM MIXED REALITY SMART GLASSES AND SOFTWARE FOR VISION IMPAIRED USE

(71) Applicant: ThirdEye Gen, Inc, Princeton, NJ (US)

(72) Inventor: Nick Cherukuri, Princeton, NJ (US)

(73) Assignee: THIRDEYE GEN, INC., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,315

(22) Filed: Dec. 7, 2020

(51) Int. Cl.
*G02B 27/01* (2006.01)
*H04W 4/80* (2018.01)
*G06T 19/00* (2011.01)

(52) U.S. Cl.
CPC ........ *G02B 27/0172* (2013.01); *G06T 19/006* (2013.01); *H04W 4/80* (2018.02); *G02B 2027/0178* (2013.01)

(58) Field of Classification Search
CPC .... G06F 3/0346; G06F 3/04845; G06F 1/163; G09G 2354/00; G09G 2320/0261; G09G 2320/0626; G02B 27/0172; G02B 2027/0178; H04W 4/80; G06T 19/006
See application file for complete search history.

(56) References Cited

U.S. PATENT DOCUMENTS

| | | | |
|---|---|---|---|
| 9,240,074 B2 | 1/2016 | Berkovich et al. | |
| 10,567,641 B1* | 2/2020 | Rueckner | H04N 5/2257 |
| 2008/0239452 A1* | 10/2008 | Xu | G02C 7/101 |
| | | | 359/265 |
| 2015/0260474 A1* | 9/2015 | Rublowsky | A63F 13/213 |
| | | | 434/16 |
| 2016/0232625 A1* | 8/2016 | Akutagawa | G06K 19/0707 |
| 2017/0285345 A1 | 5/2017 | Ferens et al. | |
| 2018/0089904 A1* | 3/2018 | Jurgenson | G06F 3/012 |
| 2018/0332205 A1* | 11/2018 | Hawthorne | G06F 3/017 |
| 2020/0125317 A1* | 4/2020 | Sabin | G06F 3/167 |

* cited by examiner

*Primary Examiner* — Robert J Michaud
(74) *Attorney, Agent, or Firm* — Meagher Emanuel Laks Goldberg & Liao, LLP

(57) ABSTRACT

An augmented reality eyewear device is configured to operate augmented reality applications and provides a wide-angle field view that can be utilized for low vision, vision impaired, and the blind. The software utilizes custom firmware to enable features such as greyscale viewing and the use of smart glasses in outdoors and indoors. The hardware is specifically designed to be entirely hands-free with no wires, thereby enabling easy use by the low vision community. Further, the augmented reality eyewear device is used for Glaucoma, Macular degeneration and other vision-impaired impairments.

16 Claims, 4 Drawing Sheets

CUSTOM MIXED REALITY SMART GLASSES AND SOFTWARE FOR VISION IMPAIRED USE

TECHNICAL FIELD

The present invention generally relates to augmented reality, and more specifically relates to a sensor fusion augmented reality eyewear device with a wide field of view that can be utilized for low vision, vision impaired, and the blind.

BACKGROUND

Interactive viewing systems have found application in manufacturing automation and maintenance, surgical procedures, educational instruction, mechanical, architectural, and interior designs, multimedia presentations, and motion picture production. Such interactive viewing systems work by displaying computer-generated overlay images, such as a rendering of annotations, blueprints, component parts, buildings, backgrounds, and other images, in a user's field-of-view of a real-world environment to provide information about the real-world objects.

One type of interactive viewing system is referred to as an augmented reality (AR) system. Some augmented-reality approaches rely upon a head-mounted display. These head-mounted displays often have the form-factor of a pair of glasses. Such displays place artificial images over a portion the user's view of the world. Such head-mounted displays are typically either optical see-through mechanisms or video-based mechanisms. Some conventional approaches attempt to use augmented reality to provide user interface. For example, a virtual display may appear on a table surface to provide an alphanumeric-input mechanism in an application setting where no such user-input mechanism otherwise exists, or an on/off switch may appear on a wall to permit having the user switch some aspect of the physical world or the augmentation to be switched on and off via manipulation of that switch. Few existing head-mounted augmented reality devices are discussed as follows.

US20170285345 entitled "augmented reality in a field of view including a reflection" discloses a system comprising eyeglasses including a transparent display screen that is coupled with an image capture device on a user, and a reality augmenter to automatically generate an augmented reality object based on an identification of an object in a field of view of the user that is to include a reflection of the user from a reflective surface, wherein the augmented reality object is to be observable by the user on the transparent display screen when the user wears the eyeglasses. Real objects in a field of view of the user are augmented by the AR object using SLAM (Simultaneous Localization and Mapping) process. The device further comprises wireless communication interface.

U.S. Pat. No. 9,240,074 B2 entitled "network-based real time registered augmented reality for mobile devices" discloses a method of operating a mobile device with a camera, a display, and a position sensor to provide a display of supplementary information aligned with a view of a scene. One or more image obtained from the camera is uploaded to a remote server together with corresponding data from the position sensor. Image processing is then performed to track image motion between that image and subsequent images obtained from the camera, determining a mapping between the uploaded image and a current image. Data is then received via the network indicative of a pixel location for display of supplementary information within the reference image. The mapping is used to determine a corresponding pixel location for display of the supplementary information within the current image, and the supplementary information is displayed on the display correctly aligned with the view of the scene. Further, SLAM techniques are used for the local tracking.

Though the discussed prior art references are useful to some extent for some purposes, these prior efforts sometimes yield a poor user experience. Therefore, there is a need for a sensor fusion augmented reality eyewear device with a wide field of view to provide better user experience.

BRIEF SUMMARY

The present invention generally discloses a wearable device. Further, the present invention discloses a sensor fusion augmented reality eyewear device to operate augmented reality applications.

According to the present invention, the augmented reality eyewear device is configured to be worn by a user to operate augmented reality applications. In one embodiment, the eyewear device comprises a frame. In one embodiment, the frame is associated with a processor, a sensor assembly, a camera assembly, and a user interface control assembly. In one embodiment, the processor is in communication with the sensor assembly, the camera assembly, and the user interface control assembly for transferring and receiving signals/data. In one embodiment, the processor could be, but not limited to, an android based snapdragon processor. In one embodiment the processor comprises an android based operating system. In one embodiment, a fan assembly in communication with the processor is configured to increase or decrease the fan speed based on the processor's heat. In one embodiment, the device further comprises a light assembly in communication with the processor.

In one embodiment, the frame supports a pair of glasses lens/optical display in communication with the processor and a camera PCB board. The frame is further integrated with a wireless transceiver which is coupled to the processor. In one embodiment, the sensor assembly comprises at least two inertial measurement unit (IMU) sensors. In one embodiment, at least one IMU is a raw IMU and at least one IMU is an android connected IMU. In one embodiment, the processor could receive the sensor data in a dual combined manner. In one embodiment, the at least two IMU sensors are configured to rotate to match with an axis of at least two wide angle cameras. In one embodiment, the camera is a 13-megapixel HD camera. In one embodiment, the eyewear device allows the user to present (display) a desired magnification, which may be a preset magnification level. That is, in some embodiments, the user can preset multiple magnification levels, and then, on command, the eyewear device can then display at one of those preset magnification levels. In one embodiment, the sensor assembly further comprises a light sensor coupled to the processor. The light sensor is configured to input environmental conditions to the processor for providing a display characteristic based on the environmental conditions. In one embodiment, the sensor assembly further comprises, but not limited to, a thermal sensor, a flashlight sensor, 3-axis accelerometer, 3-axis compass, 3-axis gyroscope, and a magnetometer sensor.

In one embodiment, the camera assembly comprises at least two wide angle cameras. The two wide angle cameras are synchronized with one another to transmit camera feed data from the camera assembly to the processor. In one embodiment, the camera feed data from the two wide angle cameras are combined into a single data before processing by the processor via an I2C electrical connection. The placement and angle of the camera assembly could be customizable for simultaneous localization and mapping of an environment. The processor is configured to dually synchronize raw IMU Data and android connected IMU data with the camera feed data providing a seamless display of 3D content of the augmented reality applications In one embodiment, the user interface control assembly comprises an audio command control, a head motion control and a wireless Bluetooth control. The user interface enables the user to control the eyewear device.

In one embodiment, the eyewear device further comprises one or more built-in communication units. In one embodiment, the communication unit is a wireless communication unit. In one embodiment, the eyewear device further comprises a speaker system to deliver audio data to the user via the communication unit. The communication unit includes, but not limited to, a Bluetooth®. The communication unit is connected to one or more Bluetooth hearing aids configured to deliver audio data. In one embodiment, the speaker system comprises a built-in Bluetooth to deliver and receive the audio data wirelessly. In one embodiment, the eyewear device allows the registered users to use its features without any internet access. In one embodiment, the eyewear device allows the user to record video and/or take pictures using voice commands or audio commands. The eyewear device uses audio commands for all functions such as zoom level (1, 2, 3), high contrast, inverted contrast, and zoom or magnification view. In one embodiment, the maximum zoom is about 8× (digital zoom). In one embodiment, the eyewear device further utilizes Open CV (Open Source Computer Vision Library) mechanism. The Open CV mechanism allows for low latency (<2 ms) switching into greyscale and other modes.

In one embodiment, the eyewear device further comprises features such as live view, greyscale view, universal product code (UPC) lookup, high contrast view, inverted contrast view, optical character recognition (OCR) readback, toggle flashlight, and decreased aspect ratio mode. The eyewear device allows the user to turn on the flashlight for low light reading situations and provides auditory command at the same time. In one embodiment, the eyewear device shrinks the horizontal and vertical size of the application. It allows users who are unable to easily to the edges of the screen.

The eyewear device further comprises a thermal camera, an integrated slam or SLAM (Simultaneous Localization and Mapping) system, a visual odometry tracking, environment meshing, a dominant plane detection and a dynamic occlusion. In one embodiment, the thermal camera could be coupled to the camera PCB board. In one embodiment, the eyewear device further comprises a connector port assembly having a mini-jack port and a Universal Serial Bus Type-C (USB-C) port. The eyewear device is further adapted to use in both indoor and outdoor with different brightness level depending on indoor and outdoor settings. The brightness level is automatically adjusted from about 300 nits to about 500 nits. The indoor and outdoor settings are detected using an Ambient Light Sensor (ALS). In one embodiment, the eyewear device allows the user to turn on a flashlight for low light reading situations and provides auditory command.

Other objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
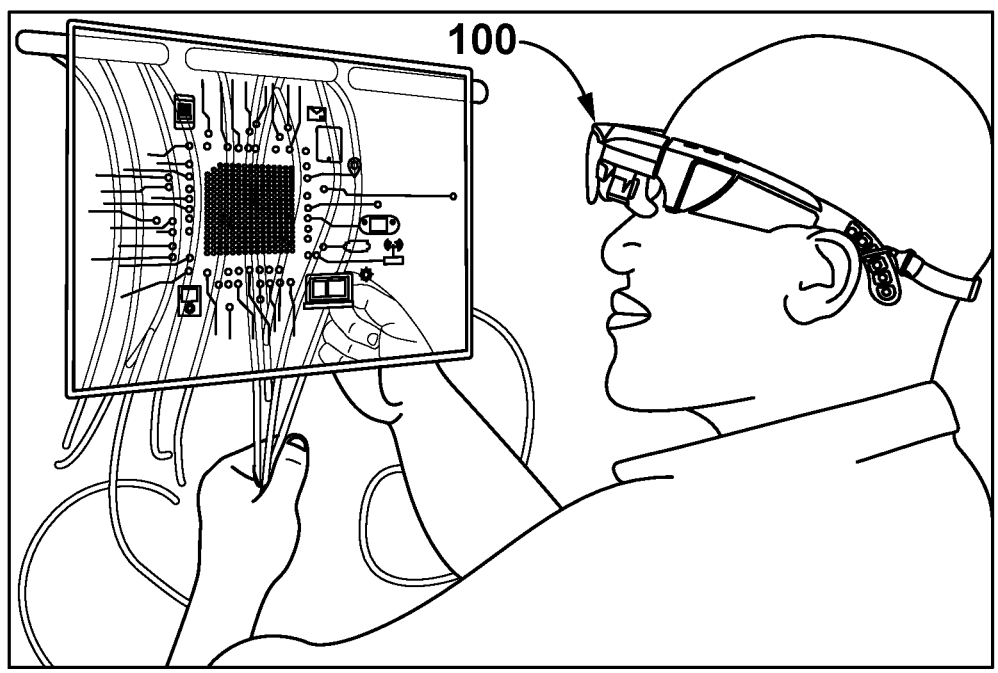
FIG. 1 exemplarily illustrates a user viewing a virtual image through the display of an sensor fusion eyewear device in an embodiment of the present invention.

The present invention discloses a sensor fusion augmented reality eyewear device to operate augmented reality applications. Referring to FIG. 1, a user viewing the virtual image through the sensor fusion augmented reality eyewear device 100 is illustrated. The device 100 is configured to operate augmented reality applications and provides a wide-angle field view which refers to cameras with over 110 degree field of view located on the front of the smart glasses which capture a wider field of view. The software utilizes custom firmware to enable features such as greyscale viewing which views the world in a greyed out setting not RGB colors so that point clouds of the world can be better identified to stitch into a 3D viewpoint for SLAM gathering and the use of smart glasses in outdoors and indoors. The hardware is specifically designed to be entirely hands-free with no wires, thereby enabling easy use by the low vision community. Further, the device 100 is used by patients with Glaucoma, Macular degeneration and other vision-related impairments.

Figure 2:
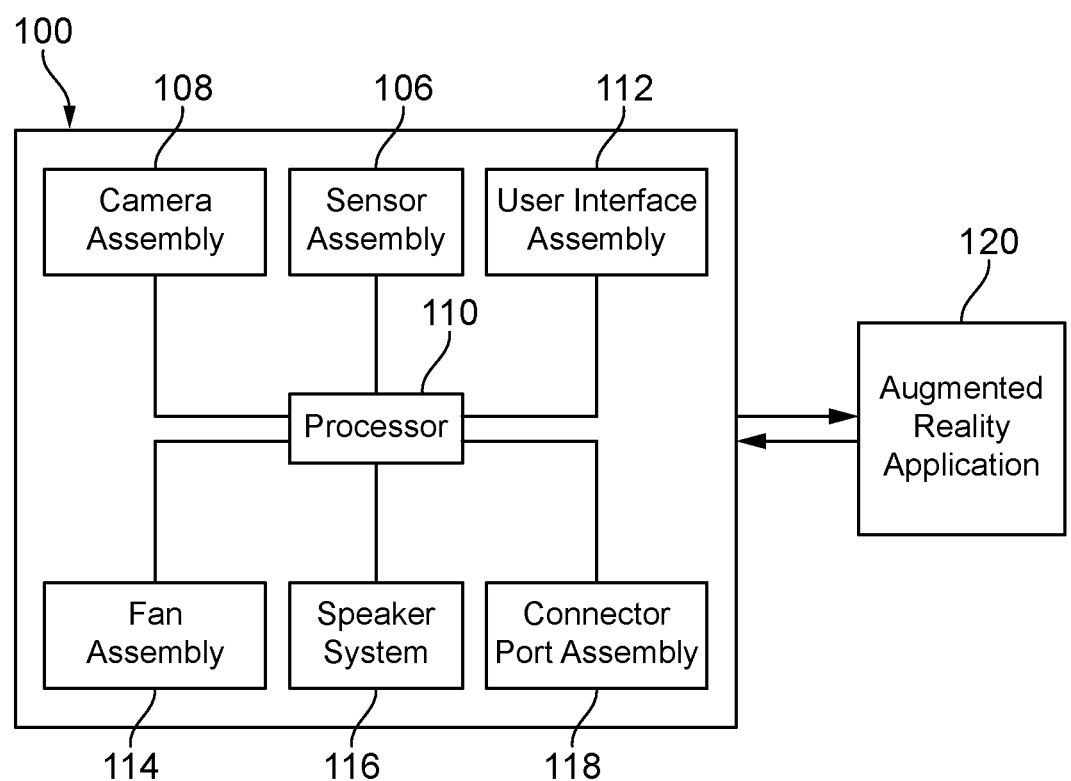
FIG. 2 exemplarily illustrates various components and their connections of the eyewear device in an embodiment of the present invention.
Figure 3:
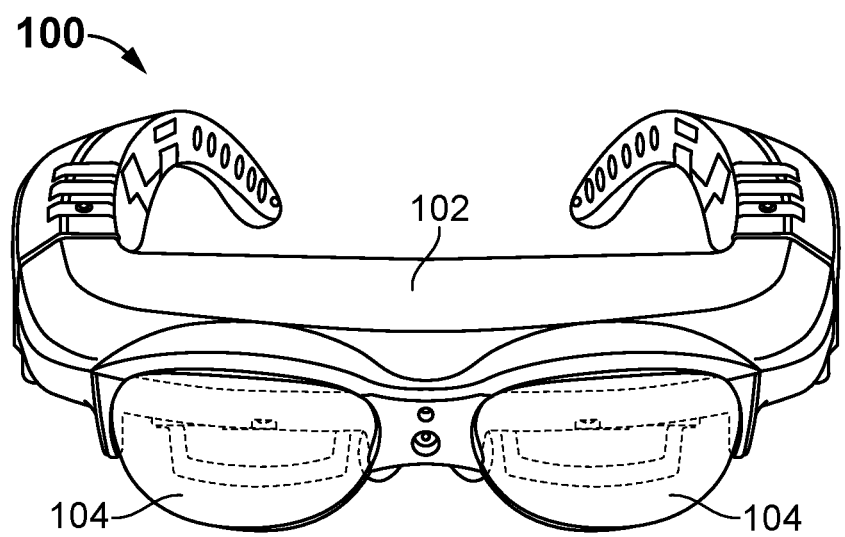
FIG. 3 exemplarily illustrates a front perspective view of the sensor fusion augmented reality eyewear device in an embodiment of the present invention.

Referring to FIG. 2 and FIG. 3, the device 100 comprises a frame 102 supporting a glasses lens/optical display 104, which is configured to be worn by the user. The frame 102 is associated with a processor. The processor utilized is the qualcomm xr1 processor which contains 4 GB RAM, 64 GB storage, an integrated cpu/gpu and an additional memory option via usb-c port. The processor is located on the left hand side arm enclosing of the thirdeye x2 smart glasses and shielded with protective material to dissipate the processor heat. 110, a sensor assembly 106 in communication with the processor 110, a camera assembly that consists of 1 13 megapixel RGB camera, 2 wide angle grey scale cameras, a flashlight, an ambient light sensor (ALS) and a thermal sensor. All of these camera sensors are located on the front face of the X2 MR Glasses and angled 5 degrees below horizontal in order to closely match the natural human field of view. 108 in communication with the processor 110 and a user interface control assembly 112 in communication with the processor 110. The user interface control assembly 112 comprises audio command control, head motion control and wireless Bluetooth controller which is an android wireless keypad controlled via the built in Bluetooth BT 5.0 LE system in the xr1 processor. The head motion control utilizes the build in android IMU sensor in order to track the user's head movement via three degrees of freedom i.e. if a user moves their head to the left the cursor moves to the left as well. The audio commands are controlled by a 3 mic system located in the front of the glasses that captures audio commands in English. These different modes of UI allow the user to pick and choose their personal preference for UI. The optical display 104 is coupled to the processor 110 and a camera PCB board.

In one embodiment, the sensor assembly 106 comprises at least two inertial measurement unit (IMU) sensors. In one embodiment, at least one IMU is a raw IMU sensor which is not connected to the android settings layer because it will allow the app to access the raw IMU feed instead of the IMU data (acceleration, gyrometer) to be filtered via the android network and at least one IMU sensor is an android connected IMU meaning this is a standard android device IMU that can be accessed by android 9.0 IMU calls by software developers. In an embodiment, data from a raw IMU and data from an android connected IMU data are transmitted to the processor 110. In one embodiment, the processor 110 receives sensor data in a combined manner meaning that the raw IMU located in the X2 smart glasses data is combined with the standard IMU data and averaged out to provide a more accurate reading of the user's head movements.

The camera assembly 108 generally comprises at least one camera, and preferably at least two cameras. In one embodiment, the camera assembly 108 comprises at least two wide angle greyscale cameras (e.g., cameras whose lenses have wider fields of view than a normal lens (one that best approximates the optical characteristics of the human eye)), each synchronized with each other meaning that the raw camera feed from each greyscale camera is combined and meshed together to provide a 3D view of the real world—this is done by combining each frame received from either camera and stitching them together via known image manipulation techniques, including using computer vision (OpenCV) to create an accurate point cloud 3D view of the real world. Greyscale cameras allow for more accurate 3D point cloud capture as they are not full color RGB so they identify floors, walls better, and is configured to transmit camera feed data to the processor 110. The processor 110 is configured to dually synchronized meaning that the raw camera feed from each greyscale camera is combined and meshed together to provide a 3D view of the real world raw IMU Data and data from android connected IMU with the camera feed data providing a seamless display of 3D content of the one or more augmented reality application 120. In one embodiment, the camera feed data from the at least two wide angle cameras are combined into a single data stream (camera feeds from both cameras are meshed together—greyscale cameras allow for a stitching into a 3D model of the real world) before processing by the processor 110. The processor 110 is configured to dually synchronize raw IMU Data and android connected IMU data with the camera feed data providing a seamless display of 3D content of the augmented reality application 120.

In one embodiment, the raw IMU Data and android connected IMU data are dually synced with the camera feed data via an internal clock setup to ensure that no discrepancies are found. In one embodiment, the camera feed data from at least two wide angle cameras are combined prior to processing via an I2C electrical connection. The synchronized feed also allows for seamless display of 3D content via a DSI electrical interface input from the processor 110 to the displays 104 while integrating the camera feed. In one embodiment, the at least two IMU sensor configured to rotate to match with an axis of at least two wide angle cameras meaning that the glasses combine the information from the IMUs and the cameras to track the user's position in 6 degrees of freedom and allows the smart glasses to know where it is located in space. In one embodiment, the camera is a 13 megapixel HD camera. In one embodiment, the eyewear device allows the user to present a desired magnification to up to 10× digital zoom of what the user is looking at from the smart glasses (preferably, the displayed image contains substantially uniform magnification; that is, no portions of the image are displayed at a substantially different magnification than any other portion of the image being displayed). In one embodiment, the camera assembly 108 further comprises a thermal camera coupled to a camera PCB camera board.

Further, the placement and angle of the camera assembly is preferably five degrees below horizontal to allow for the camera feed to match up with natural human view which is slightly below horizontal 108 is customizable for simultaneous localization and mapping of the environment. In some embodiments, the camera assembly 108 comprises at least three synchronized cameras to map out the environment. In one embodiment, the device 100 further comprises a VisionEye™ Simultaneous localization and mapping (SLAM) software developer's kit (SDK) tool, which utilizes the cameras on the smart glasses to map out the environment in a sophisticated manner—SLAM allows for the smart glasses to create a 3D replica of the real world and thus enable the smart glasses to track where it is in position i.e. can place a virtual hologram and walk around the hologram. VisionEye SLAM was developed by ThirdEye specifically for its smart glasses and uses the data from the IMUs and camera feeds to create this 3D location tracking.

In one embodiment, the sensor assembly 106 comprises a light sensor coupled to the processor 110 is configured to input environmental condition, and wherein the processor 110 is configured to provide a display characteristic based on the environmental condition. In one embodiment, the display characteristic may be brightness, contrast via an overlay on the AR display, and the like. The surrounding environmental condition may be a level of brightness that without the display characteristic adjustment would make the displayed content difficult to visualize by the user of the device 100, where the display characteristic adjustment may be applied to an area of the optical assembly where content is being projected.

In an embodiment, the light sensor is an RGB (Red, Green and Blue) camera, which captures environmental lighting condition, for example, indirect sunlight with a high lumens light level. Then, the light sensor would reduce or dim the optical display 104 brightness. In one embodiment, the cameras, the light, the flashlight, the thermal sensor are connected to the camera PCB board.

In one embodiment, the sensor assembly 106 further comprises thermal sensor, flashlight sensor, 3-axis accelerometer, 3-axis compass, 3-axis gyroscope, magnetometer sensor and light sensor. In one embodiment, the device 100 further comprises one or more built-in communication units. In one embodiment, the communication unit is a wireless communication unit. In one embodiment, the device 100 further comprises a speaker system or speaker 116 to deliver audio data to the user via the communication unit—the system is able to read currency, signs, etc. via its OCR (optical character recognition) feature that is trained to recognize text and provide that as audio input to the user. The communication unit includes, but not limited to, a Bluetooth® 5.0 LT mechanism located in the smart glasses XR1 processor. The communication unit is connected to one or more Bluetooth hearing aids (preferably X2 Bluetooth hearing aids) configured to deliver audio data. In one embodiment, the speaker system 116 comprises built-in Bluetooth 5.0 LE located in the xr1 processor chip to deliver and receive the audio data wirelessly. In one embodiment, the device 100 allows the registered users to use its features without any internet access. In one embodiment, the device 100 allows the user to record video and/or take pictures using voice commands or audio commands. The eyewear device uses audio commands for all functions such as zoom level (1, 2, 3), high contrast, inverted contrast (white on black contrast, black on white & grey scale viewing), and zoom or magnification view. In one embodiment, the maximum zoom is about 8× (digital zoom). In one embodiment, the device 100 further utilizes Open CV (Open Source Computer Vision Library) mechanism. The Open CV mechanism allows for low latency (<2 ms) switching into greyscale and other modes. The application customized the Open CV platform to run directly on the smart glasses DSP (Digital signal processing) service in the OS— what this enables the Open CV computer vision program to do is run its processing on the hardware instead of requiring software code to do this—this reduces the heat of the device, allows for lower latency as the DSP lets more parallel threads to run simultaneously and overall improve app performance.

In one embodiment, the eyewear device 100 further comprises features such as live view, greyscale view, universal product code (UPC) lookup, high contrast view, inverted contrast view, optical character recognition (OCR) readback, toggle flashlight, and decreased aspect ratio mode. The device 100 allows the user to turn on the flashlight for low light reading situations and provides auditory command at the same time. The user can turn on the flashlight via a custom voice command "Flashlight on" or by clicking on the flashlight icon. In one embodiment, the device 100 shrinks the horizontal and vertical size of the application. It allows users who are unable to easily to the edges of the screen.

The eyewear device 100 further comprises a connector port assembly 118 having a mini-jack port and a Universal Serial Bus Type-C (USB-C) port. The connector port assembly 118 allows users to insert their manual audio headphones. The USB-C port allows the user to charge the device or data-transfer purposes. In one embodiment, the frame 102 is further integrated with a wireless transceiver coupled to the processor 110. The device 100 further comprises a fan assembly 114 coupled to the processor 110, wherein the fan assembly 114 is synchronized to speed up or slow down based on the processor's heat.

In one embodiment, the user interface control assembly 112 comprises audio software developer's kit (SDK) and documentation for audio commands, head tracking SDK and documentation for head motion controls, a wireless controller for wireless Bluetooth control which is any standard android 9.0 Bluetooth controller keypad that can be used to control the smart glasses UI as well.

In one embodiment, the processor 110 comprises an android based operating system. In another embodiment, the processor 110 is an android based snapdragon. In yet another embodiment, the device 100 comprises System on Module (SoM) processor. In yet another embodiment, the device 100 uses Adreno 530 GPU ARM based chip with 4 GB RAM and 64 GB Storage and Android 8.0 as operating system. The device design optimizes the frame rate of the processor 110 between 60 fps and 30 fps to be in synchronize with the IMUs. In an embodiment, the processor firmware is highly optimized for the device design. The camera firmware in the android build system of the processor 110 was autofocused, which required configuring specific variables to each camera's actuator information. The system allows for the user to set a continuous autofocus or switch manually back and forth—autofocus is also trained to recognize text and focus on it i.e. for a book. Further, specific device drivers were built for the speaker 116 and individual sensors like the flashlight (a sensor located in the front of the glasses) and thermal sensor. Therefore, the standard 820 processor android framework was highly customized for the device 100.

In one embodiment, the device 100 further comprises an integrated slam or SLAM (Simultaneous Localization and Mapping) system, visual odometry tracking, environment meshing, dominant plane detection and dynamic occlusion which utilizes the IMUs and camera systems to create this SLAM tracking system mentioned earlier.

Advantageously, the device 100 is configured to be used in both indoor and outdoor with different brightness level depending on different ambient lighting conditions, e.g., indoor and outdoor settings. In some embodiments, the brightness level can be varied continuously, proportional to the detected ambient light. In other embodiments, the brightness level is adjusted whenever a threshold ambient light level is detected, such as when moving from a dark room to bright outdoor sunlight. In some embodiments, the brightness level is automatically adjusted from about 300 nits to about 500 nits when moving from indoor to outdoor, or from about 500 nits to about 300 nits if moving from outdoor to indoor. The indoor and outdoor settings are detected using an Ambient Light Sensor (ALS) which is a sensor that is located on the front of the smart glasses to detect light levels and creates data points from this—the brightness level is then coded in the firmware to change at certain ALS data points. In one embodiment, the device 100 allows the user to turn on a light source, such as a flashlight, for low light reading situations and provides auditory commands and/or feedback for the user to control via voice commands (e.g., hearing the user say "Turn Flashlight On", and then turning on the flashlight and (optionally) stating "Flashlight is turned on"). In one embodiment, the device 100 uses I2C electrical connection to connect to different sensors.

The device 100 further comprises a custom LVDS to DSI high speed data transfer connection to convert the data into a format that could be read from the 820-processing chip to the optical displays 104. A High-speed data connection were utilized between the processing chip and the 6 Degrees of Freedom IMU. The IMU is also connected to the android OS pipeline so that the IMU data can be read by the Android operating system.

Figure 4:
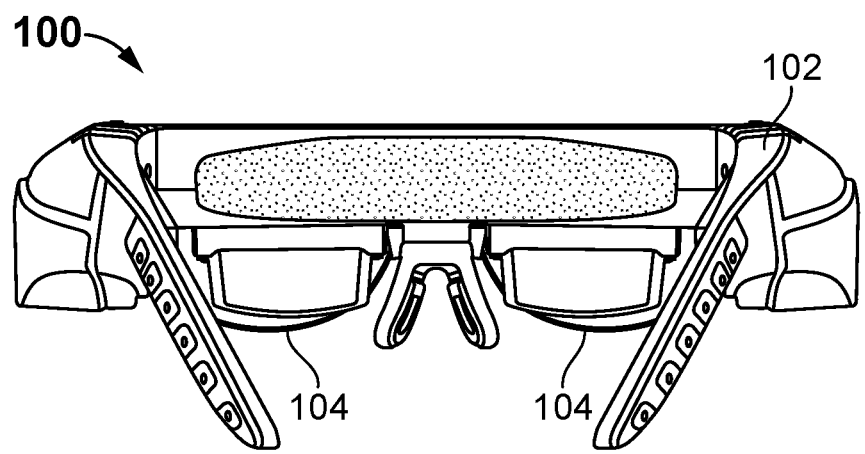
FIG. 4 exemplarily illustrates a rear perspective view of the sensor fusion augmented reality eyewear device in an embodiment of the present invention.

FIG. 4 exemplarily illustrates a rear perspective view of the sensor fusion augmented reality eyewear device 100 in an embodiment of the present invention. In one embodiment, the device 100 comprises non-replaceable battery to supply power. Further, the device 100 fits all mechanical, electrical and software into a single mechanical form factor.

The optical display 104 of the device 100 is a stereoscopic see through dual display with a wide field of view of 45° diagonal. The processor 110 powers up the optical displays 104, which render content in front of the user of the smart glasses or eyewear device 100. The field of view of the smart glasses 100 is wider than existing device, is due to the nature of the optical waveguides used in the smart glasses Advantageously, the device 100 allows eyeglass wearers to attach prescriptive corrective lens via optical partner. Also, the positioning of the individual components is uniquely designed to ensure that the electrical design was optimized. The major heating component of the 820 processor was siloed from the other heating components such as speaker 116, to ensure the heat dissipation of the device 100 was optimized and that the weight was evenly distributed. In one embodiment, the materials chosen for the moulding were also optimized for heat dissipation with a metal heat sink placed at the front of the device 100.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An augmented reality eyewear device to operate augmented reality applications, comprising:
   a frame supporting an optical display configured to be worn by a user, wherein said frame is associated with:
   a processor;
   a sensor assembly coupled to the processor, the sensor assembly comprising at least two inertial measurement unit (IMU) sensors including:
   a first IMU sensor configured to transmit raw data; and
   a second IMU sensor configured to have IMU data accessed via android operating system IMU calls, where the sensor assembly is configured to transmit the raw IMU data of the first IMU sensor and the IMU data accessed via the android operating system IMU calls of the second IMU sensor to the processor;
   a camera assembly coupled to the processor comprising at least two wide angle cameras synchronized with one another configured to transmit camera feed data from the camera assembly to the processor; and
   a user interface control assembly coupled to the processor,
   wherein the processor is configured to dually synchronize the raw IMU data and the IMU data accessed via the android operating system IMU calls with the camera feed data providing a seamless display of three-dimensional (3D) content of the augmented reality applications.

2. The eyewear device of claim 1, wherein the processor comprises an android based operating system.

3. The eyewear device of claim 1, wherein the at least two IMU sensor configured to rotate to match with an axis of at least two wide angle cameras.

4. The eyewear device of claim 1, wherein the device is configured to allow a user to present a desired magnification.

5. The eyewear device of claim 1, further comprises a built-in communication unit.

6. The eyewear device of claim 5, wherein the built-in communication unit is a Bluetooth® communication unit connected to one or more Bluetooth hearing aids, and the communication unit is configured to deliver audio data.

7. The eyewear device of claim 1, wherein the device is configured to allow a user to record video and/or take pictures using a voice command.

8. The eyewear device of claim 1, utilizes custom firmware to use an Open CV mechanism of the processor.

9. The eyewear device of claim 8, wherein the Open CV mechanism is configured to provide allows for low latency switching into greyscale and other between modes via software digital signal processing (DSP).

10. The eyewear device of claim 1, further comprises an integrated slam or SLAM (Simultaneous Localization and Mapping) system.

11. The eyewear device of claim 1, is configured to use a different brightness level depending on whether the device is being used indoors or outdoors.

12. The eyewear device of claim 11, wherein the brightness level is automatically adjusted from about 300 nits to about 500 nits.

13. The eyewear device of claim 11, wherein the device makes a determination whether the device is being used indoors or outdoors based on a signal from an Ambient Light Sensor (ALS).

14. The eyewear device of claim 1, wherein the device is configured to allow a user to turn on a light source for low light reading situations using a voice command.

15. The eyewear device of claim 1, further comprising visual odometry tracking, environment meshing, dominant plane detection and dynamic occlusion.

16. The eyewear device of claim 1, wherein all features are capable of being used without any internet access.

* * * * *